US008353768B2

(12) United States Patent
Shuster

(10) Patent No.: US 8,353,768 B2
(45) Date of Patent: Jan. 15, 2013

(54) CARD GAME APPARATUS AND METHOD WITH DEALT CARD DISCLOSURE FEATURE

(76) Inventor: Gary Stephen Shuster, Fresno, CA (US)

( * ) Notice: Subject to any disclaimer, the term of this patent is extended or adjusted under 35 U.S.C. 154(b) by 387 days.

(21) Appl. No.: 12/822,945

(22) Filed: Jun. 24, 2010

(65) Prior Publication Data

US 2010/0311486 A1 Dec. 9, 2010

Related U.S. Application Data

(63) Continuation of application No. 11/533,236, filed on Sep. 19, 2006, now Pat. No. 7,744,464.

(51) Int. Cl.
*A63F 13/00* (2006.01)

(52) U.S. Cl. ............................... 463/31; 463/11; 463/16

(58) Field of Classification Search .................... 463/11, 463/12, 13, 16, 31; 273/149 R, 149 P, 244.2, 273/274, 292, 309
See application file for complete search history.

(56) References Cited

U.S. PATENT DOCUMENTS

| | | | | |
|---|---|---|---|---|
| 4,926,327 | A | 5/1990 | Sidley | |
| 5,382,025 | A | 1/1995 | Sklansky et al. | |
| 5,713,574 | A | 2/1998 | Hughes | |
| 6,007,066 | A * | 12/1999 | Moody | 273/292 |
| 6,065,753 | A | 5/2000 | Morosky | |
| 6,585,267 | B2 | 7/2003 | Webb | |
| 6,637,746 | B1 | 10/2003 | Baranauskas | |
| 6,638,161 | B2 | 10/2003 | Soltys et al. | |
| 7,296,799 | B1 | 11/2007 | Baker | |
| 2006/0025193 | A1 * | 2/2006 | Gail et al. | 463/16 |
| 2006/0068870 | A1 | 3/2006 | Crawford, III et al. | |
| 2007/0060240 | A1 * | 3/2007 | White | 463/13 |

OTHER PUBLICATIONS

"Duplicate Poker Rules", Aug. 2, 2007, pp.1-9; http://www.duplicatepoker.com/WebSite/epokerusa.aspx?page=dpg_rules.

* cited by examiner

*Primary Examiner* — James S McClellan
(74) *Attorney, Agent, or Firm* — Connolly Bove Lodge & Hutz LLP; Jonathan Jaech

(57) ABSTRACT

A method of managing a card game, a computer implementation thereof, and a card game kit are disclosed. In the method, a plurality of cards are dealt in one or more rounds to a plurality of players, each player receiving one or more cards in each round, with each card bearing a designated value and suit. The values and suits of the cards dealt are recorded in each round. Those values and suits are then revealed to the players during one or more of the rounds to enable the players to wager or withdraw from the game.

20 Claims, 1 Drawing Sheet

CARD GAME APPARATUS AND METHOD WITH DEALT CARD DISCLOSURE FEATURE

CROSS REFERENCE TO RELATED APPLICATION

This application is a continuation of U.S. application Ser. No. 11/533,236 filed Sep. 19, 2006 now U.S. Pat. No. 7,744,464, which application is specifically incorporated herein, in its entirety, by reference.

BACKGROUND OF THE INVENTION

1. Field of the Invention

The field of the present invention is card games.

2. Background

Numerous card games are known in the art, many of which are played with multiple players in competition against one another. In these various games, one or more decks of playing cards are shuffled and dealt to the players. Each player plays using the cards that are randomly dealt to each respective player. The outcome of such games is not determined by luck alone, but also involves an element of skill on the part of the players. For example, card games such as bridge, poker, pinochle, and other such games are generally recognized as involving both luck and skill in competitive game play. While some of these games have been around for many years in their current form, new games, and even new variations on old games, are always needed as players' skills and tastes change over time.

SUMMARY OF THE INVENTION

The present invention is directed toward a method of managing a card game, a computer implementation thereof, and a card game kit. In the method, a plurality of cards, each bearing a designated value and suit, are dealt in one or more rounds to a plurality of players, with each player receiving one or more cards in each round. The values and suits of the cards dealt in each round is recorded. The recorded values and suits are revealed to the players during one or more of the rounds so that the players may either wager or withdraw from the game. Preferably, when the values and suits of the cards are revealed, they are revealed in a manner which is not indicative of the cards dealt to each player.

In the computer-implemented method, an electronic card game interface is served to a plurality of players. The interface may be served to at least one of the players using a network. In one or more rounds of play, a plurality of simulated cards from a simulated deck of cards are allocated to the players within a computer memory. Each player receives one or more of the simulated cards in each round, and each simulated card is assigned a designated value and suit. During one or more of the rounds, the values and suits assigned to the allocated simulated cards is revealed to the players so that the players may either wager or withdraw from the game.

The card game kit comprises a plurality of playing cards, each bearing a designated value and suit, and instructions which include rules to a card game. The rules describe playing the card game as a series of steps. Initially, a first round of cards is dealt, with each player receiving one or more cards. The values and suits of the cards dealt in the first round are recorded. The recorded values and suits are revealed to the players so that the players may either wager or withdraw from the game. One or more subsequent rounds are dealt, with each non-withdrawing player receiving one or more cards in each subsequent round. The values and suits of the cards dealt in each subsequent round is recorded and revealed to the players so that the non-withdrawing players may either wager or withdraw from the game during each subsequent round. Game play continues until one of the players is determined to be the winner.

Accordingly, an improved method of managing a card game, a computer implementation thereof, and a card game kit are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
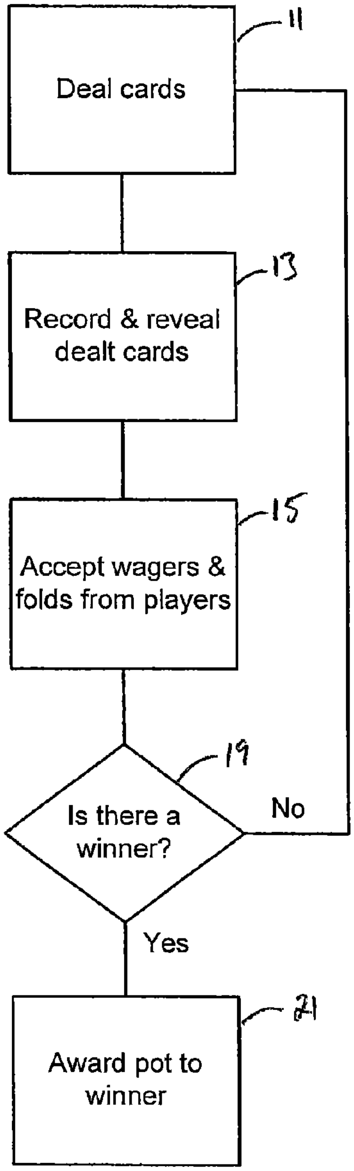
FIG. 1 is a flowchart illustrating a process for managing a card game.

Turning in detail to the drawings, FIG. 1 is a flowchart showing a process for managing a card game. Initially, one or more cards are dealt 11 to each player in a first round of the game. The cards may be of any type, but for simplicity, the remainder of the description below refers to a standard deck of playing cards of the type commonly used in the various incarnations of poker. The number of cards dealt to each player in the first round may vary from one to many, with the number generally depending upon other game rules agreed to by the players. For example, the players may agree to play the card game in a manner similar to one of the poker games "5 Card Stud" or "Texas Hold 'Em", in which case each player is dealt two cards in the first round. The remainder of the game may be played in a manner substantially similar to either of the aforementioned card games, but including the additional recordation and revelation 13 of dealt cards as described below.

After the first round of cards have been dealt 11, the dealer records and reveals 13 the values and suits of all cards dealt in the first round to each player. The cards are preferably revealed to the players in an order that is not indicative of the cards held by each player. For example, the dealt cards may be revealed in order of value, in order of suit, or in any other order which is not related to the order in which the cards were dealt. The players are then permitted to place a wager in the round or fold 15 and withdraw from the game. Alternatively, in any round, the values and suits of the cards dealt may be revealed to the players after the players decide to place a wager or withdraw. Where the card game proceeds in a manner similar to a poker game, the wagering and folding options for players may also proceed according to the rules of the particular poker game. Alternatively, the players may set their own rules for wagering and folding during any particular round.

Following wagering in the first round, if one of the players is determined to be the winner 19, then the accumulated wagers are awarded 21 to the winner. If there is no winner after the first round, game play proceeds to successive rounds which are played in a manner similar to game play in the first round, until one of the players wins and is awarded the accumulated wagers.

Several variations are possible during game play. For example, the values and suits of the cards dealt need not be revealed following dealing in the first round, but instead may be revealed during any one or more of the subsequent rounds.

Figure 2:
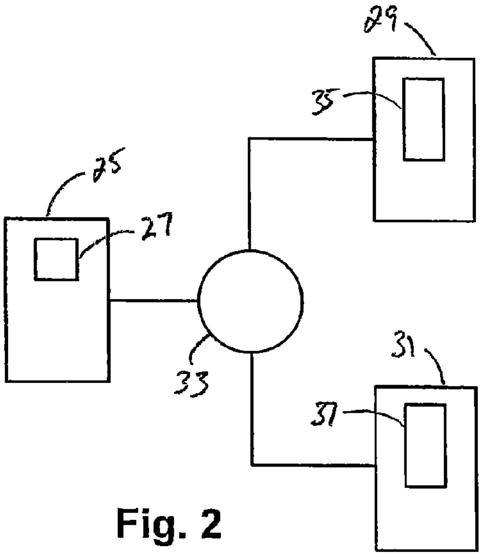
FIG. 2 schematically illustrates a computer network over which a card game may be played.

The method of managing a card game described above may be implemented using a single computer, or using multiple computers connected over a local area network or a wide area network. The single computer configuration is best suited for use by a single human player who plays against one or more computer-generated player representations, i.e., simulated players, although a single computer, multi-human player configuration is possible. FIG. 2 shows a multiple computer configuration which includes a host computer 25 which runs processes using a memory 27 for the simulated game. The players interact with the host computer 25 through other computers 29, 31 connected to the host computer 25 over a network 33. Each of the player computers 29, 31 includes a player interface 35, 37 for displaying the card game to each respective human player. Optionally, the host computer may also include a player interface for use by one of the players. Each of the networked computers includes an input device (not shown), e.g., keyboard, mouse, touch-screen display, and the like, which allows the player to interact with the processes of the simulated game.

In the computer implemented card game, the simulated game processes allocate simulated cards from a simulated deck to each of the players according to the rules of the card game as discussed above in connection with FIG. 1. The simulated deck is preferably a representation of a standard deck of playing cards for poker, although any suitable simulated deck of cards may be used. Through each successive round of the simulated card game, the players interact with the simulated game processes to place wagers or withdraw from the game as desired, until one of the players wins and is awarded the accumulated wagers.

Figure 3:
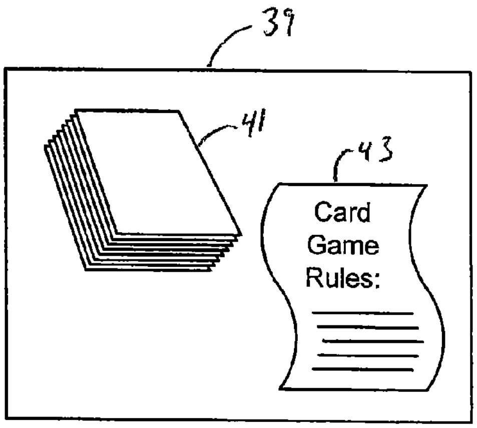
FIG. 3 illustrates a card game kit.

FIG. 3 shows a card game kit 39 which includes a deck of cards 41 and instructions 43. The deck of cards 41 is preferably a standard deck of playing cards for poker, although any suitable deck of cards may be used. The instructions 43 provide the rules of game play as discussed above in connection with FIG. 1.

Thus, a method of managing a card game, a computer implementation thereof, and a card game kit are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method, comprising:

randomly allocating, using a computer, data indicating a value and suit for each of multiple cards of a card game in a computer memory, thereby dealing one of the cards to each of multiple players of the card game in each round of one or more rounds of play; and revealing to each of the players the values and suits for all of the cards dealt to the players during the card game arranged in an order that is not indicative of which cards are allocated to each player, to enable the players to do one of wager or withdraw from the game during the one or more rounds of play.

2. The method of claim 1, further comprising interacting with the players via client devices over a network.

3. The method of claim 2, further comprising serving the data for the card game to the client devices.

4. The method of claim 1, wherein revealing the values and suits for all of the cards dealt comprises revealing the assigned values and suits in order of the value of each dealt card.

5. The method of claim 4, wherein revealing the values and suits for all of the cards dealt comprises revealing the assigned values and suits also in order of the suit of each dealt card.

6. The method of claim 1, wherein revealing the values and suits for all of the cards dealt comprises revealing the assigned values and suits in an order that is not related to any order in which cards are dealt to the players during the one or more rounds.

7. The method of claim 1, wherein revealing the values and suits for all of the cards dealt comprises revealing the assigned values and suits during each round.

8. The method of claim 1, wherein revealing the values and suits for all of the cards dealt comprises revealing the assigned values and suits before the players do one of wager or withdraw from the game.

9. The method of claim 1, wherein revealing the values and suits for all of the cards dealt comprises revealing the assigned values and suits using a computer display device.

10. The method of claim 1, further comprising representing at least one of the players as a computer-generated player representation.

11. An apparatus, comprising a computer coupled to a memory configured for operating processes comprising:

randomly allocating data indicating a value and suit for each of multiple cards of a card game in the memory, thereby dealing one of the cards to each of multiple players of the card game in each round of one or more rounds of play; and revealing to each of the players the values and suits for all of the cards dealt to the players during the card game arranged in an order that is not indicative of which cards are allocated to each player, to enable the players to do one of wager or withdraw from the game during the one or more rounds of play.

12. The apparatus of claim 11, wherein the memory is further configured for interacting with the players via client devices over a network.

13. The apparatus of claim 12, wherein the memory is further configured for serving the data for the card game to the client devices.

14. The apparatus of claim 11, wherein the memory is further configured for revealing the values and suits for all of the cards dealt in order of the value of each dealt card.

15. The apparatus of claim 14, wherein the memory is further configured for revealing the values and suits for all of the cards dealt also in order of the suit of each dealt card.

16. The apparatus of claim 11, wherein the memory is further configured for revealing the values and suits for all of the cards dealt in an order that is not related to any order in which cards are dealt to the players during the one or more rounds.

17. The apparatus of claim 11, wherein the memory is further configured for revealing the values and suits for all of the cards dealt during each round.

18. The apparatus of claim 11, wherein the memory is further configured for revealing the values and suits for all of the cards dealt before the players do one of wager or withdraw from the game.

19. The apparatus of claim 11, wherein the memory is further configured for revealing the values and suits for all of the cards dealt using a computer display device in communication with the one or more computers.

20. The apparatus of claim 11, wherein the memory is further configured for representing at least one of the players as a computer-generated player representation.

* * * * *